US010514843B2

(12) United States Patent
Chen

(10) Patent No.: US 10,514,843 B2
(45) Date of Patent: Dec. 24, 2019

(54) METHOD FOR DISPLAYING VIRTUAL KEYPAD OVERLAPPING AN APPLICATION AND ELECTRONIC DEVICE

(71) Applicants: Beijing Lenovo Software Ltd., Beijing (CN); Lenovo (Beijing) Limited, Beijing (CN)

(72) Inventor: Chen Chen, Beijing (CN)

(73) Assignees: Beijing Lenovo Software Ltd., Beijing (CN); Lenovo (Beijing) Limited, Beijing (CN)

( * ) Notice: Subject to any disclaimer, the term of this patent is extended or adjusted under 35 U.S.C. 154(b) by 593 days.

(21) Appl. No.: 14/671,310

(22) Filed: Mar. 27, 2015

(65) Prior Publication Data
US 2016/0103607 A1    Apr. 14, 2016

(30) Foreign Application Priority Data

Oct. 11, 2014    (CN) ..................... 2014 1 0535730

(51) Int. Cl.
*G06F 3/048* (2013.01)
*G06F 3/0488* (2013.01)
*G06F 3/0482* (2013.01)

(52) U.S. Cl.
CPC ........ *G06F 3/04886* (2013.01); *G06F 3/0482* (2013.01); *G06F 3/04883* (2013.01)

(58) Field of Classification Search
CPC .................... G06F 3/04886; G06F 3/04883
See application file for complete search history.

(56) References Cited

U.S. PATENT DOCUMENTS

2010/0323762 A1* 12/2010 Sindhu .............. G06F 1/1613
                                                          455/566
2011/0264442 A1* 10/2011 Huang ............... G06F 3/04886
                                                          704/9
(Continued)

FOREIGN PATENT DOCUMENTS

CN    101089806 A    12/2007
CN    103037106 A     4/2013
(Continued)

OTHER PUBLICATIONS

Stern, Joanna, Lenovo IdeaPad s310-3t Review, Mar. 10, 2010, engadget.com, pp. 1-9, https://www.engadget.com/2010/03/10/lenovo-ideapad-s10-3t-review/#gallery=56274&slide=644884&index=41.*

(Continued)

*Primary Examiner* — Jeanette J Parker
(74) *Attorney, Agent, or Firm* — Schwegman Lundberg & Woessner, P.A.

(57) ABSTRACT

The disclosure provides an information processing method. The method includes: detecting a first input operation by a touch sensing unit; determining whether a first condition is satisfied; executing a first instruction set if it is determined that the first condition is satisfied; and executing a second instruction set different from the first instruction set if it is determined that the first condition is not satisfied, the first instruction set includes at least a first display instruction for displaying an array of input identities by a display unit which is overlapped with the touch sensing unit, and the array of input identities includes at least one input identity, the input identity being an identity which is capable of being triggered by a second input operation detected by the touch sensing unit in order to input data corresponding to the input (Continued)

identity. The method can make input operations more convenient.

10 Claims, 3 Drawing Sheets

(56) References Cited

U.S. PATENT DOCUMENTS

| | | | |
|---|---|---|---|
| 2012/0206363 A1* | 8/2012 | Kyprianou | G06F 3/04883 345/168 |
| 2012/0260207 A1* | 10/2012 | Treskunov | G06F 3/04886 715/773 |
| 2014/0351762 A1* | 11/2014 | Park | G06F 3/0482 715/835 |
| 2014/0372952 A1* | 12/2014 | Otero | G06F 17/246 715/835 |
| 2015/0109207 A1* | 4/2015 | Li | H04M 1/23 345/158 |
| 2015/0293694 A1* | 10/2015 | Bozzini | G06F 3/0482 715/773 |

FOREIGN PATENT DOCUMENTS

| | | |
|---|---|---|
| CN | 103596027 A | 2/2014 |
| CN | 104007890 A | 8/2014 |
| EP | 1302850 A2 | 4/2009 |

OTHER PUBLICATIONS

"Chinese Application No. 201410535730.1, Office Action dated Jan. 13, 2017", w/ English Translation, (Jan. 13, 2017), 28 pgs.

* cited by examiner

METHOD FOR DISPLAYING VIRTUAL KEYPAD OVERLAPPING AN APPLICATION AND ELECTRONIC DEVICE

CROSS-REFERENCE TO RELATED APPLICATION(S)

This application claims priority to Chinese Patent Application No. 201410535730.1, filed on Oct. 11, 2014; which is incorporated herein by reference in its entirety.

TECHNICAL FIELD

The present disclosure relates to the field of intelligent electronic device techniques, and particularly to an information processing method and an electronic device.

BACKGROUND

Notebooks with a touch screen become more and more popular. In some scenes where a notebook with a touch screen is used, such as inputting an excel table, a user needs to switch back and forth between two operations of touching the touch screen and tapping the physical keypad of the notebook, making the arms of the user strained and resulting in a low input efficiency.

SUMMARY

Embodiments of the disclosure provide an information processing method and an electronic device.

An embodiment of the disclosure provides an information processing method, comprising:

detecting a first input operation by a touch sensing unit;
determining whether a first condition is satisfied;
executing a first instruction set if it is determined that the first condition is satisfied; and
executing a second instruction set if it is determined that the first condition is not satisfied, the second instruction set being different from the first instruction set,
wherein the first instruction set comprises at least a first display instruction for displaying an array of input identities by a display unit which is overlapped with the touch sensing unit, and wherein the array of input identities comprises at least one input identity, the input identity being an identity which is capable of being triggered by a second input operation detected by the touch sensing unit in order to input data corresponding to the input identity.

An embodiment of the disclosure further provides an electronic device comprising:

a display unit, configured to display content of the electronic device;
a touch sensing unit overlapped with the display unit, configured to detect an input operation;
a processing unit, configured to determine whether a first condition is satisfied when a first input operation is detected by the touch sensing unit, execute a first instruction set if it is determined that the first condition is satisfied, and execute a second instruction set if it is determined that the first condition is not satisfied, the second instruction set being different from the first instruction set;
wherein the first instruction set comprises at least a first display instruction for displaying an array of input identities by the display unit, and wherein the array of input identities comprises at least one input identity, the input identity being an identity which is capable of being triggered by a second input operation detected by the touch sensing unit in order to input data corresponding to the input identity.

DETAILED DESCRIPTION

Figure 1:
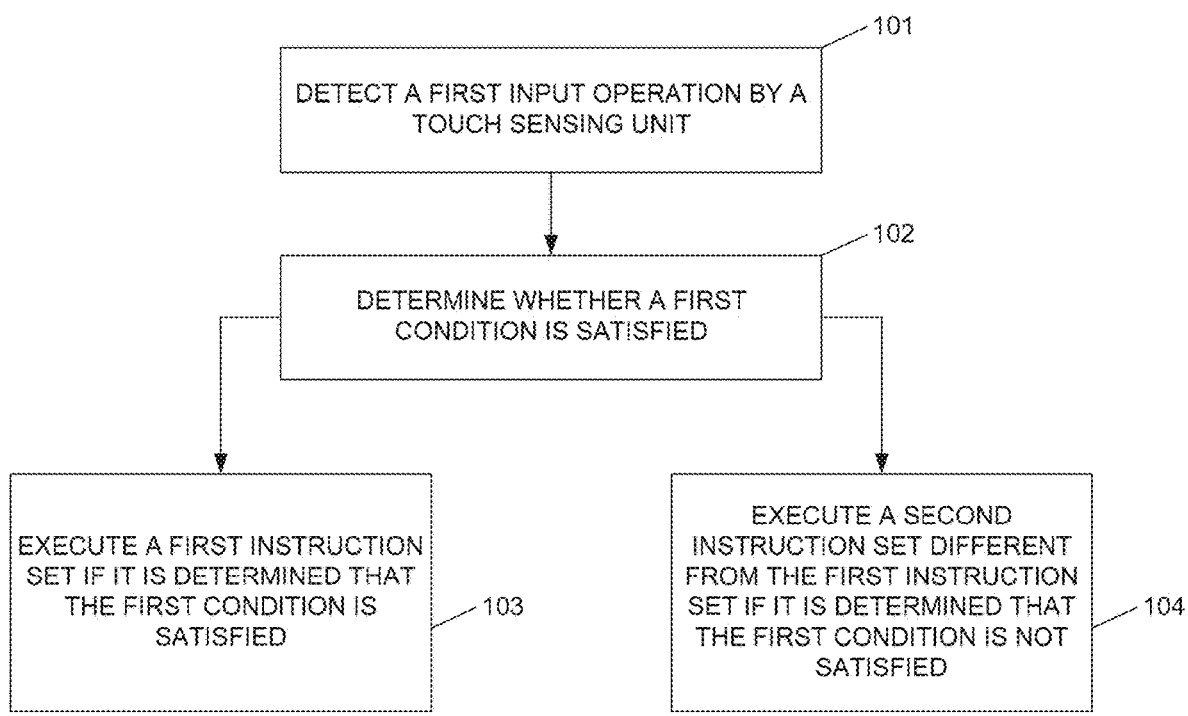
FIG. 1 is a flowchart of the information processing method according to a first embodiment of the disclosure.

In a current touch device (or a multiple-modes device in a touch mode, such as the pad mode of a multiple-mode notebook), a soft keypad is typically invoked when the user clicks an input box, while in a keypad device (or a multiple-modes device in a keystroke mode, such as the laptop mode of a multiple-mode notebook), the soft keypad is not always invoked when the user clicks an input box. The traditional soft keypad is a keypad generated and displayed on a screen, rather than on the physical keypad. The soft keypad simulates a keypad using software and inputs characters by mouse clicking. The traditional soft keypad comprises a soft keypad that comes with a system, or a software virtualized soft keypad, etc. Because the display is controlled by the touch screen (such as turning a page by a sliding gesture) on the keypad device (or in the keystroke mode of a multiple-modes device), if the amount of the input is small, implementing the input directly by the touch screen will be more convenient, which may decrease the movement of the hands of the user (toggling between the physical keypad and the touch screen).

In order to achieve the above object, embodiments of the disclosure are proposed. An electronic device according to the embodiments of the disclosure firstly determines its operation mode when a touch operation of the user is detected, and performs the following processes when the operation mode indicates that a touch screen of the electronic device is in an operation state (i.e., the touch screen of the electronic device is capable of detecting a touch input normally) and that a physical keypad of the electronic device is in an operation state (i.e., the electronic device is capable of receiving a physical keypad input normally):

determining whether the pop-up condition of the soft keypad is satisfied currently; if the pop-up condition of the soft keypad is satisfied currently, performing an operation of popping up the soft keypad on the display screen and receiving a touch input via the popped-up soft keypad; and if the pop-up condition of the soft keypad is not satisfied currently, not performing the operation of popping up the soft keypad on the display screen and receiving a physical keypad input via the physical keypad.

The operation mode indicates that the touch screen and the physical keypad are both in their operation states. For example, if a notebook is equipped with a touch screen and a physical keypad, its touch screen and physical keypad are in the operation state. As another example, if a multiple-mode device is in the keystroke mode, its touch screen is also in the operation state (such as the laptop mode of a multiple-mode notebook).

The soft keypad popped up on the display screen may be either the traditional soft keypad (such as, a soft keypad that comes with a system, or a software virtualized soft keypad, etc) or a specific soft keypad generated specially for the touch operation. The embodiments of the disclosure define the pop-up condition of the soft keypad so that the user can input a little amount of data directly via the soft keypad popped up on the touch screen without inputting via the physical keypad when the user controls the display via the touch screen and when there is a little amount of data to be inputted, making the user operation convenient and decreasing the movement of the hands of the user (toggling between the physical keypad and the touch screen).

The solutions of the disclosure will be further described below in connection with the figures and the embodiments. The embodiments of the disclosure are applicable to the case where the electronic device is in the following operation mode: the touch screen of the electronic device is in an operation state (i.e., the touch screen of the electronic device is capable of detecting a touch input normally) and that the physical keypad of the electronic device is in an operation state (i.e., the electronic device is capable of receiving a physical keypad input normally).

The First Embodiment

The first embodiment of the disclosure provides an information processing method for use in an electronic device. As shown in FIG. 1, the method comprises the following steps.

At step 101, a touch sensing unit detects a first input operation.

The touch sensing unit is a component commonly used in an electronic device having a touch sensing function. In an embodiment of the disclosure, the touch sensing unit is overlapped with a display unit of the electronic device. The display unit is used for displaying content of the electronic device. The electronic device can sense a touch action of the user by using the touch sensing unit, and detect to obtain a corresponding input operation which, of course, comprises a first input operation as will be described later in the first embodiment of the disclosure. The first input operation may be that a certain sensing location on the touch sensing unit is triggered by a touch operation of the user. This location may correspond to a certain display location on the display unit. The display location may be a location of a displayed input box of a certain application, or a location of a certain displayed input button, to which the embodiments of the disclosure should not be limited. The triggering operation of the user may be a clicking, a double-clicking, a longtime pressing, etc.

At step 102, it is determined whether a first condition is satisfied.

Determining whether a first condition is satisfied may comprise: determining whether the first input operation satisfies the first condition, and/or, determining whether an application for which the first input operation is performed satisfies the first condition. According to the determination, it is determined which of the subsequent step 103 or step 104 will be performed. The step 103 is performed if it is determined that the first condition is satisfied, or otherwise the step 104 is performed.

At step 103, a first instruction set is executed if it is determined that the first condition is satisfied.

At step 104, a second instruction set is executed if it is determined that the first condition is not satisfied, the second instruction set being different from the first instruction set.

The first instruction set comprises at least a first display instruction for displaying an array of input identities by a display unit which is superimposed with the touch sensing unit. The array of input identities comprises at least one input identity, the input identity being an identity which is capable of being triggered by a second input operation detected by the touch sensing unit and inputting data corresponding to the input identity. It should be appreciated that the array of input identities according to the embodiment of the disclosure may be a traditional soft keypad, or a specific soft keypad generated specially for the touch operation, wherein the specific soft keypad is a virtual soft keypad generated specifically for the first input operation, and if the first input operation varies or the application for which the first input operation is performed varies, input identities in the specific soft keypad will also vary. Or said differently, the content of the generated specific soft keypad is not fixed.

Preferably, the first instruction set comprises a first display instruction and a first processing instruction, and the second instruction set comprises the first processing instruction, wherein the first processing instruction is to perform a first process corresponding to the first input operation, the first process being different from the process of the first display instruction. The first instruction set is different from the second instruction set in that the second instruction set does not comprise the first display instruction. That is, the electronic device determines whether the first condition is satisfied according to the current circumstance when the first input operation is obtained. If the first condition is satisfied, the array of input identities will be displayed on the display unit after the first instruction set is executed; or if the first condition is not satisfied, the array of input identities will not be displayed on the display unit after the second instruction set is executed.

Furthermore, the method may also comprise:
if it is determined that the first condition is satisfied:
displaying the array of input identities by the display unit;
detecting a second input operation by the touch sensing unit after the array of input identities is displayed; and
inputting data corresponding to an input identity triggered by the second input operation;
if it is determined that a second condition is satisfied:
detecting a third input operation by a keystroke unit; and
inputting data corresponding to an input identity triggered by the third input operation. The keystroke unit may be a physical keypad or a virtual soft keypad.

Location parameters in the content of the third input and the second input may be identical. The location parameters are used to control the display locations of data corresponding to the input identities.

In the above solution, the first condition may be that the first input operation is an operation for positioning an area where a data input can be received (for example, positioning, by a touch, a data input location in the area where a data input can be received). The first processing instruction is used to determine the data input location of the positioning operation, and to generate notification information so that the input of the virtual soft keypad/physical keypad can be displayed at the data input location.

The first condition may further comprise that an application for which the first input operation is performed satisfies a first sub-condition, and/or an area for the first input operation where a data input can be received satisfies a second sub-condition. For example, the application for which the first input operation is performed belongs to a preset white application list, and/or the area for the first input operation where a data input can be received accepts only the digital input, and so on.

In the above solution, executing the first display instruction further comprises: calculating a display location for the array of input identities according to the data input location of the positioning operation and based on a first parameter; and displaying the array of input identities at a corresponding display location by the display unit overlapped with the touch sensing unit. As such, the display location for the array of input identities can be controlled to be around the data input location, so as to facilitate operations performed on the array of input identities. Particularly, the array of input identities can be controlled to be displayed below, or at the right of, the data input location, and the distance between the array of input identities and the data input location is below a preset threshold, such as below 100 pixels.

In the above solution, executing the first display instruction further comprises: obtaining a set of identities which are acceptable by the area for the first input operation where a data input can be received; and constructing the array of input identities with the set of identities. As an example, the area for the first input operation where a data input can be received only accepts digital inputs, and thus the array of input identities should be constructed with only digital identities.

In the above solution, executing the first display instruction further comprises: constructing the array of input identities according to statistic on data inputted into an interface which includes an area capable of receiving data input and a corresponding number of input times. Constructing the array of input identities according to data inputted into the interface and the corresponding number of times further comprises: constructing the array of input identities based on the input identities corresponding to the data for which the number of input times within a first preset duration is higher than a first threshold; or, obtaining one or more specific types of input identities corresponding to data for which the number of input times within a first preset duration is higher than a first threshold, and constructing the array of input identities with the one or more specific types of input identities. For example, when inputting in an excel table, a statistic is made on the input identities corresponding to the data for which the number of input times in an excel table within a first preset duration before the current input operation is higher than a first threshold, and the array of input identities is constructed with those identities; or when inputting in an excel table, a statistic is made on the input identities corresponding to the data for which the number of input times in an excel table within a first preset duration before the current input operation is higher than a first threshold, and the array of input identities is constructed with all the identities of specific type(s) to which those identities belong (such as the type of digital characters, unit characters, etc.).

In the above solution, after constructing the array of input identities, the method further comprises: generating a set of soft keypad keys corresponding to the array of input identities which comprises at least one input identity, the set of soft keypad keys comprising at least one soft keypad key; creating a mapping relationship between identities (or referred to as key values) in the array of input identities and soft keypad keys in the set of soft keypad keys, generating a specific soft keypad display box according to the mapping relationship, displaying the specific soft keypad display box by the touch sensing unit, the specific soft keypad display box comprising at least one soft keypad key, each key corresponding to one input identity. By constructing the array of input identities, creating a mapping relationship and generating a specific soft keypad display box, the user, using a keypad device (or in the keystroke mode of a multiple-modes device) can input a little data by the touch screen directly when the user controls the display by the touch screen, thereby decreasing the movement of the hands of the user (toggling between the physical keypad and the touch screen), making the user operation convenient and improving the input efficiency.

In the above solution, after displaying the specific soft keypad display box, the method may further comprises: obtaining a second input operation for a specific key in the specific soft keypad display box via the touch sensing unit, searching the created mapping relationship between the identities and the soft keypad keys, obtaining an identity matching with the specific key, and displaying data corresponding to the obtained identity in the specific soft keypad display box.

In the above solution, after displaying the specific soft keypad display box, the method may further comprises:

making a statistic on the number of operations for the keys in the specific soft keypad display box, and deleting, from the mapping relationship, identities corresponding to the keys for which the number of operations during a second preset duration is below a second threshold; and/or making a statistic on identities having no corresponding key in the specific soft keypad display box and a corresponding number of input times, adding, into the array of input identities, identities having no corresponding key in the specific soft keypad display box for which the number of input times during a third preset duration is higher than a third threshold, creating a mapping relationship between the newly added identities and the corresponding new soft keypad keys, and displaying the new soft keypad keys according to the mapping relationship in the specific soft keypad display box.

The Second Embodiment

Figure 2:
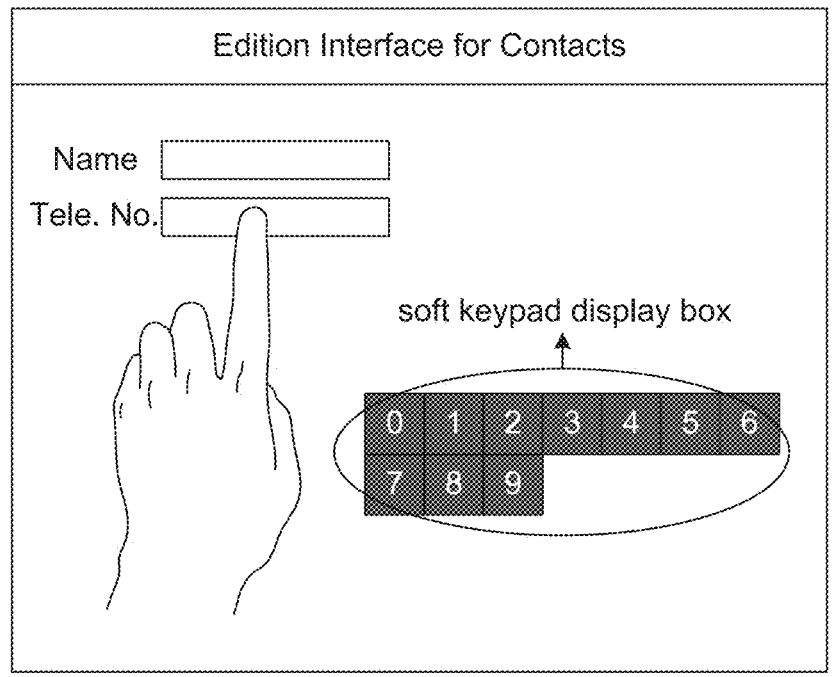
FIG. 2 is a schematic diagram illustrating an interface in the case that the disclosure is applicable according to a second embodiment of the disclosure.

In the second embodiment of the disclosure, the first condition is that the first input operation is an operation for positioning an area where a data input can be received, and the application for which the first input operation is performed satisfies a first sub-condition. FIG. 2 shows a schematic diagram illustrating an interface in the case that the disclosure is applicable according to a second embodiment of the disclosure. The implementation of the second embodiment of the disclosure is described as follows.

The user accesses the edition interface for the contacts by using the electronic device according to the embodiment of the disclosure, touches and clicks a telephone number input box for a certain contact. At that time, the electronic device detects the first input operation by a touch sensing unit. The electronic device determines that the first input operation is an operation for positioning an area where a data input can be received and that the contact application for which the first input operation is performed belongs to applications in a preset white list (i.e., satisfying a first sub-condition), and thus determines that the first condition is currently satisfied. Accordingly, the electronic device determines that a set of identities allowed to be input in the area where a data input can be received comprises all the digital identities, and then constructs the array of input identities with all the digital identities and generates a set of soft keypad keys corresponding to the array of input identities which comprises at least one input identity, the set of soft keypad keys comprising at least one soft keypad key. A mapping relationship between the identities in the array of input identities and the soft keypad keys in the set of soft keypad keys is created, a specific soft keypad display box is generated according to the mapping relationship, and the specific soft keypad display box is displayed by the touch sensing unit. As shown by the display box in FIG. 2, the specific soft keypad display box comprises the at least one soft keypad key, each key corresponding to one input identity.

After displaying the specific soft keypad display box, the user can manually trigger a key in the soft keypad display box. The electronic device may obtain a second input operation for a specific key (i.e., the key manually triggered by the user) in the specific soft keypad display box via the touch sensing unit, search the created mapping relationship between the identities and the soft keypad keys, obtain an identity matching with the specific key, and display data corresponding to the obtained identity in the current input box. For example, the user manually triggers the digital key "2" in the soft keypad display box, and the electronic device searches the created mapping relationship and obtains the identity "2" corresponding to the key, and then displays data corresponding to the identity "2" in the telephone number input box.

In the second embodiment of the disclosure, after detecting the first input operation by the touch sensing unit, the electronic device determines that the first input operation is an operation for positioning an area where a data input can be received and that the application for which the first input operation is performed belongs to applications in a preset white list, and thus determines that the first condition is satisfied and then executes the first instruction set. The array of input identities to be displayed by the display unit is generated by executing the first instruction set. Then a second input operation for the array of input identities is detected by the touch sensing unit, and the identities of data corresponding to the input identities are inputted. If it is determined that the first condition is not satisfied, the electronic device executes a second instruction set, to perform the first process corresponding to the first input operation. Then the electronic device may also detect a third input operation by the keystroke unit, and input data corresponding to the input identity triggered by the third input operation.

In the second embodiment of the disclosure, based on the filtering condition for applications, the generation and display of a corresponding array of input identities are triggered only for those applications requiring a little input data or a rapid input, and otherwise (such as for the application inputting a document, because the array of input identities as described in the embodiments of the disclosure is not suitable for the input of a lot of documents), no generation and display of the array of input identities will be triggered. This solution not only facilitates the operation of the user, but also implements the accurate positioning of the identities to be inputted. Furthermore, since the number of the identities is relatively small, the soft keypad for the array of input identities can be rapidly popped on and thus the input efficiency is improved.

The Third Embodiment

Figure 3:
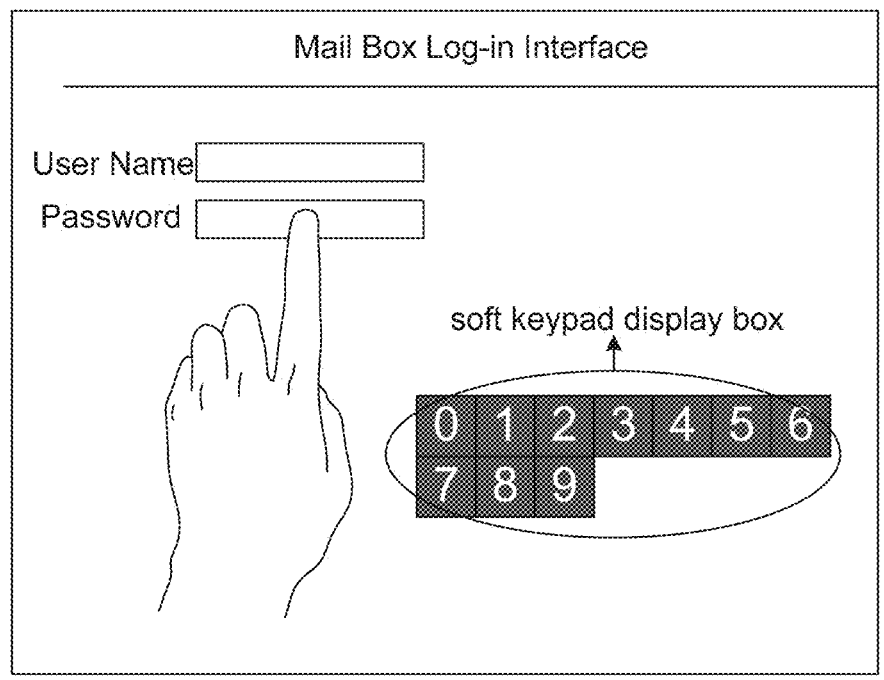
FIG. 3 is a schematic diagram illustrating an interface in the case that the disclosure is applicable according to a third and a fourth embodiments of the disclosure.

In the third embodiment of the disclosure, the first condition is that the first input operation is an operation for positioning an area where a data input can be received, and the area for the first input operation where a data input can be received satisfies a second sub-condition. The second condition is only that the first input operation is an operation for positioning an area where a data input can be received. FIG. 3 shows a schematic diagram illustrating an interface in the case that the disclosure is applicable according to a third embodiment of the disclosure. The implementation of the third embodiment of the disclosure is described as follows.

The user accesses a mail box log-in interface by using the electronic device according to the embodiment of the disclosure, touches and clicks a user name input box. At that time, the electronic device detects the first input operation by a touch sensing unit. The electronic device determines that the first input operation is an operation for positioning an area where a data input can be received, but the area for the first input operation where a data input can be received accepts a full-key-value input (i.e., the second sub-condition is not satisfied), and then determines that the first condition is not satisfied currently but the second condition is satisfied. Therefore, the electronic device detects a third input operation by a keystroke unit (a physical keypad or a virtual soft keypad), and inputs data corresponding to the input identity triggered by the third input operation.

The user touches and clicks a password input box. At this time, the electronic device detects a first input operation by a touch sensing unit. The electronic device determines that the first input operation is an operation for positioning an area where a data input can be received, and that the area for the first input operation where a data input can be received accepts only the digital input (i.e., the second sub-condition is satisfied), and then determines that the first condition is satisfied currently. Accordingly, the electronic device obtains all the digital identities, and constructs the array of input identities with all the digital identities and generates a set of soft keypad keys corresponding to the array of input identities which comprises at least one input identity, the set of soft keypad keys comprising at least one soft keypad key. A mapping relationship between the identities in the array of input identities and the soft keypad keys in the set of soft keypad keys is created, a specific soft keypad display box is generated according to the mapping relationship, and the specific soft keypad display box is displayed by the touch sensing unit. The specific soft keypad display box comprises the at least one soft keypad key, each key corresponding to one input identity.

After displaying the specific soft keypad display box, the user can manually trigger a key in the soft keypad display box. The electronic device may obtain a second input operation for a specific key (i.e., the key manually triggered by the user) in the specific soft keypad display box via the touch sensing unit, search the created mapping relationship between the identities and the soft keypad keys, obtain an identity matching with the specific key, and display data corresponding to the obtained identity in the current input box.

In the third embodiment of the disclosure, after detecting the first input operation by the touch sensing unit, the electronic device determines that the first input operation is an operation for positioning an area where a data input can be received and that the area for the first input operation where a data input can be received accepts only the digital input (i.e., the second sub-condition is satisfied), and thus determines that the first condition is satisfied and then executes the first instruction set. The array of input identities to be displayed by the display unit is generated by executing the first instruction set. Then a second input operation for the array of input identities is detected by the touch sensing unit, and the identities of data corresponding to the input identities are inputted. If it is determined that the first condition is not satisfied, the electronic device executes a second instruction set, to perform the first process corresponding to the first input operation. Then the electronic device may also detect a third input operation via the keystroke unit, and input data corresponding to the input identity triggered by the third input operation.

In the third embodiment of the disclosure, based on the input limitation condition for the area where a data input can be received, the generation and display of a corresponding array of input identities is only triggered for the applications requiring a little input data, and otherwise (such as for the area that accepts a full-key-value input), no generation and display of the array of input identities will be triggered. This solution not only facilitates the operation of the user, but also implements the accurate positioning of the identities to be inputted. Furthermore, since the number of the identities is relatively small, the soft keypad for the array of input identities can be rapidly popped on and thus the input efficiency is improved.

The Fourth Embodiment

In the fourth embodiment of the disclosure, the first condition is that the first input operation is an operation for positioning an area where a data input can be received, and the area for the first input operation where a data input can be received satisfies a second sub-condition. The second condition is only that the first input operation is an operation for positioning an area where a data input can be received. FIG. 3 shows a schematic diagram illustrating an interface in the case that the disclosure is applicable according to a fourth embodiment of the disclosure. The implementation of the fourth embodiment of the disclosure is described as follows.

The user accesses a mail box log-in interface by using the electronic device according to the embodiment of the disclosure, touches and clicks a user name input box. At this time, the electronic device detects a first input operation by a touch sensing unit. The electronic device determines that the first input operation is an operation for positioning an area where a data input can be received, but the area for the first input operation where a data input can be received accepts a full-key-value input (i.e., the second sub-condition is not satisfied), and then determines that the first condition is not satisfied currently but the second condition is satisfied. Therefore, the electronic device detects a third input operation by a keystroke unit (a physical keypad or a virtual soft keypad), and inputs data corresponding to the input identity triggered by the third input operation.

The user touches and clicks a password input box. At this time, the electronic device detects a first input operation by a touch sensing unit. The electronic device determines that the first input operation is an operation for positioning an area where a data input can be received, and that the area for the first input operation where a data input can be received accepts only digital inputs and only accepts digital inputs of a length within 10 characters (i.e., the second sub-condition is satisfied), and then determines that the first condition is satisfied currently. Accordingly, the electronic device obtains all the digital identities, and constructs the array of input identities with all the digital identities and generates a set of soft keypad keys corresponding to the array of input identities which comprises at least one input identity, the set of soft keypad keys comprising at least one soft keypad key. A mapping relationship between the identities in the array of input identities and the soft keypad keys in the set of soft keypad keys is created, a specific soft keypad display box is generated according to the mapping relationship, and the specific soft keypad display box is displayed by the touch sensing unit. The specific soft keypad display box comprises the at least one soft keypad key, each key corresponding to one input identity.

After displaying the specific soft keypad display box, the user can manually trigger a key in the soft keypad display box. The electronic device may obtain a second input operation for a specific key (i.e., the key manually triggered by the user) in the specific soft keypad display box via the touch sensing unit, search the created mapping relationship between the identities and the soft keypad keys, obtain an identity matching with the specific key, and display data corresponding to the obtained identity in the password input box.

In the fourth embodiment of the disclosure, after detecting the first input operation by the touch sensing unit, the electronic device determines that the first input operation is an operation for positioning an area where a data input can be received and that the area for the first input operation where a data input can be received accepts only digital inputs and only digital inputs of a length within 10 characters (i.e., the second sub-condition is satisfied), and thus determines that the first condition is satisfied and then executes the first instruction set. The array of input identities to be displayed by the display unit is generated by executing the first instruction set. Then a second input operation for the array of input identities is detected by the touch sensing unit, and identities of data corresponding to the input identities are inputted. If it is determined that the first condition is not satisfied, the electronic device executes a second instruction set, to perform the first process corresponding to the first input operation. Then the electronic device may also detect a third input operation by the keystroke unit, and input data corresponding to the input identity triggered by the third input operation.

In the fourth embodiment of the disclosure, based on the input limitation condition for the area where a data input can be received, the generation and display of a corresponding array of input identities is only triggered for applications requiring a little input data, and otherwise (such as for the area that accepts a full-key-value input, or the length limitation for the input characters goes beyond the preset threshold), no generation and display of the array of input identities will be triggered. This solution not only facilitates the operation of the user, but also implements the accurate positioning of the identities to be inputted. Furthermore, since the number of the identities is relatively small, the soft keypad for the array of input identities can be rapidly popped on and thus the input efficiency is improved.

The Fifth Embodiment

Figure 4:
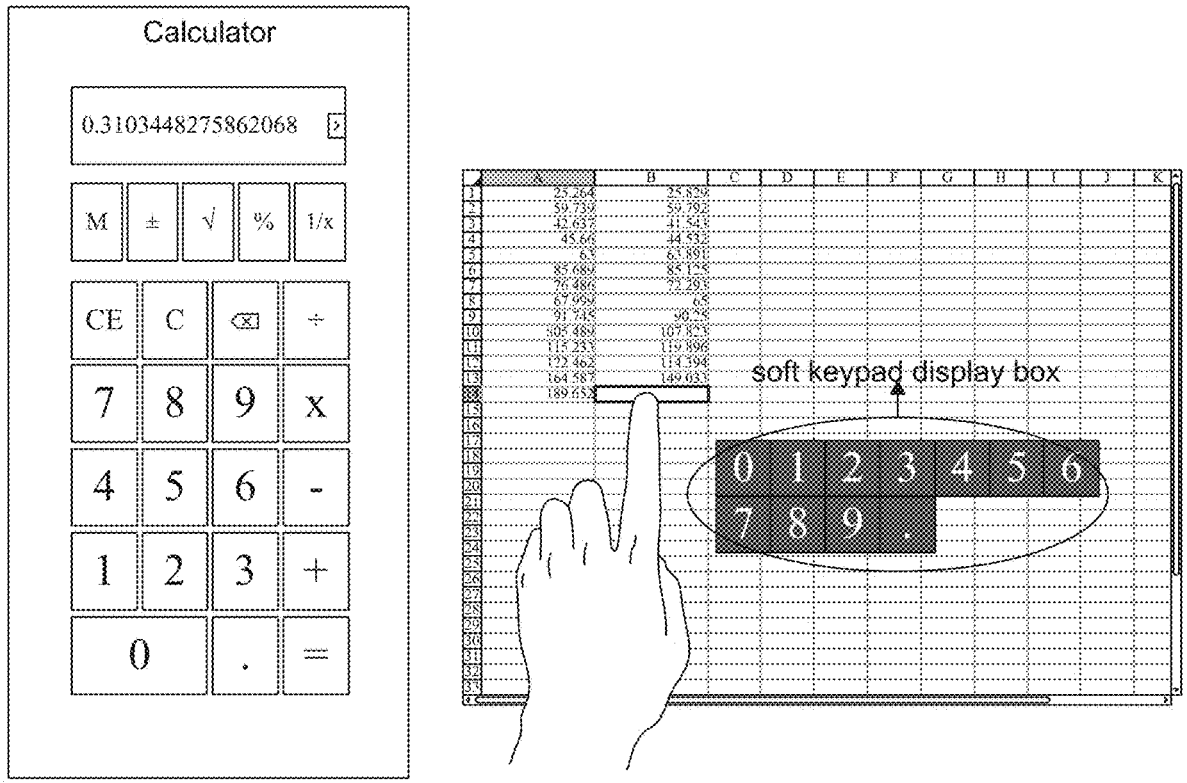
FIG. 4 is a schematic diagram illustrating an interface in the case that the disclosure is applicable according to a fifth embodiment of the disclosure.

In the fifth embodiment of the disclosure, the first condition is that the first input operation is an operation for positioning an area where a data input can be received, and the application for which the first input operation is performed satisfies a first sub-condition. FIG. 4 shows a schematic diagram illustrating an interface in the case that the disclosure is applicable according to a fifth embodiment of the disclosure. The implementation of the fifth embodiment of the disclosure is described as follows.

The user inputs in an excel table by using the electronic device according to the embodiment of the disclosure, while a calculator application for conducting a calculation operation being enabled. The user touches and clicks a certain input box in the excel table. At this time, the electronic device detects a first input operation by a touch sensing unit. The electronic device determines that the first input operation is an operation for positioning an area where a data input can be received, and the excel application for which the first input operation is performed belongs to applications in a preset white list (i.e., satisfies the first sub-condition), and then determines that the first condition is satisfied currently. Therefore, the electronic device constructs the array of input identities according to the input identities corresponding to data for which the number of input times in the excel table within a first preset duration before the current input operation is higher than a first threshold, and generates a set of soft keypad keys corresponding to the array of input identities which comprises at least one input identity, the set of soft keypad keys comprising at least one soft keypad key. A mapping relationship between the identities in the array of input identities and the soft keypad keys in the set of soft keypad keys is created, a specific soft keypad display box is generated according to the mapping relationship, and the specific soft keypad display box is displayed by the touch sensing unit. As shown by the display box in FIG. 4, the specific soft keypad display box comprises the at least one soft keypad key, each key corresponding to one input identity.

After displaying the specific soft keypad display box, the user can manually trigger a key in the soft keypad display box. The electronic device may obtain a second input operation for a specific key (i.e., the key manually triggered by the user) in the specific soft keypad display box via the touch sensing unit, search the created mapping relationship between the identities and the soft keypad keys, obtain an identity matching with the specific key, and display data corresponding to the obtained identity in a specific input box in the excel table.

It should be noted that the electronic device will not be triggered to generate a specific soft keypad display box when the input box on the operation interface of the calculator is triggered by the user, because the calculator application comprises its own soft keypad. When the excel application is closed, its corresponding specific soft keypad display box disappears from the display unit accordingly. Or said differently, the electronic device deletes its corresponding specific soft keypad display box from the display unit when it obtains a trigger instruction of closing the excel application.

In the fifth embodiment of the disclosure, after detecting the first input operation by the touch sensing unit, the electronic device determines that the first input operation is an operation for positioning an area where a data input can be received and that the application for which the first input operation is performed satisfies a first sub-condition, and thus determines that the first condition is satisfied and then executes the first instruction set. The array of input identities to be displayed by the display unit is generated by executing the first instruction set. Then a second input operation for the array of input identities is detected by the touch sensing unit, and the identities of data corresponding to the input identities are inputted.

In the fifth embodiment of the disclosure, as compared with the soft keypad provided by an existing operation system, the generated and displayed array of input identities facilitates the user to search for characters desired to be input and improves the input efficiency of the user because of its accurate positioning of the identities to be inputted and a relatively small number of the identities. Furthermore, by maintaining the array of input identities dynamically, deleting infrequently used identities and newly adding frequently used identities, the user may search for characters frequently inputted more conveniently and the input efficiency can be further improved.

The Sixth Embodiment

Figure 5:
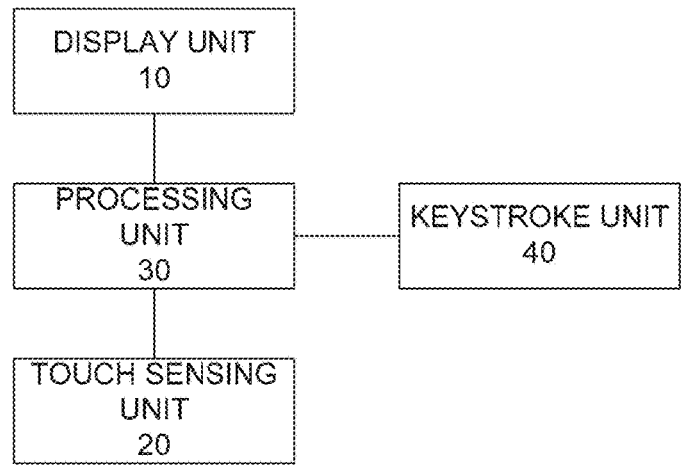
FIG. 5 is a schematic structural diagram of an electronic device according to a sixth embodiment of the disclosure.

The sixth embodiment of the disclosure provides an electronic device, as shown in FIG. 5, comprising:

a display unit 10, configured to display content of the electronic device;

a touch sensing unit 20 overlapped with the display unit 10, configured to obtain an input operation;

a processing unit 30, configured to determine whether a first condition is satisfied when a first input operation is obtained by the touch sensing unit 20, execute a first instruction set if it is determined that the first condition is satisfied; and execute a second instruction set if it is determined that the first condition is not satisfied, the second instruction set being different from the first instruction set;

wherein the first instruction set comprises at least a first display instruction for displaying an array of input identities by the display unit 10, and wherein the array of input identities comprises at least one input identity, the input identity being an identity which is capable of being triggered by a second input operation detected by the touch sensing unit 20 and inputting data corresponding to the input identity.

The first instruction set may comprise a first display instruction and a first processing instruction, and the second instruction set may comprise the first processing instruction, wherein the first processing instruction is to perform a first process corresponding to the first input operation, the first process being different from the process of the first display instruction. The first instruction set is different from the second instruction set in that the second instruction set does not comprise the first display instruction.

The first condition may be that the first input operation is an operation for positioning an area where a data input can be received (for example, positioning, by a touch, a data input location in the area where a data input can be received). The first processing instruction is used to determine the data input location of the positioning operation, and to generate notification information.

The first condition may further comprise: the application for which the first input operation is performed satisfies a first sub-condition, and/or the area for the first input operation where a data input can be received satisfies a second sub-condition. For example, the application for which the first input operation is performed belongs to a preset white application list, and/or the area for the first input operation where a data input can be received accepts only digital inputs, and so on.

The electronic device may further comprise a keystroke unit 40; and the processing unit 30 is further configured to, if it is determined that the first condition is satisfied: display the array of input identities by the display unit 10, detect a second input operation by the touch sensing unit 20 after the array of input identities is displayed, and input data corresponding to the input identity triggered by the second input operation; and if it is determined that a second condition is satisfied: detect a third input operation by the keystroke unit 40, and input data corresponding to the input identity triggered by the third input operation, wherein the keystroke unit 40 may be a physical keypad or a virtual soft keypad.

Location parameters in the content of the third input and the second input may be identical. The location parameters are used to control the display locations for data corresponding to the input identity.

When executing the first display instruction, the processing unit 30 is further configured to: calculate a display location for the array of input identities according to the data input location of the first input operation and based on a first parameter; and display the array of input identities at a corresponding display location by the display unit 10. As such, the display location for the array of input identities can be controlled to be around the data input location, so as to facilitate operations performed on the array of input identities.

When executing the first display instruction, the processing unit 30 is further configured to: obtain a set of identities which are acceptable by the area for the first input operation where a data input can be received; and construct the array of input identities with the set of identities. As an example, the area for the first input operation where a data input can be received only accepts digital inputs, and thus the array of input identities should be constructed with only digital identities.

When executing the first display instruction, the processing unit 30 is further configured to: construct the array of input identities according to statistic on data inputted into an interface which includes an area capable of receiving data input, and a corresponding number of input times. The processing unit 30 is further configured to construct the array of input identities based on the input identities corresponding to the data for which the number of input times within a first preset duration is higher than a first threshold; or, obtain one or more specific types of input identities corresponding to data for which the number of input times within a first preset duration is higher than a first threshold, and construct the array of input identities with the one or more specific types of input identities. For example, when inputting in an excel table, a statistic is made on the input identities corresponding to the data for which the number of input times in an excel table within a first preset duration before the current input operation is higher than a first threshold, and the array of input identities is constructed with those identities; or when inputting in an excel table, a statistic is made on the input identities corresponding to the data for which the number of input times in an excel table within a first preset duration before the current input operation is higher than a first threshold, and the array of input identities is constructed with all the identities of specific type(s) to which those identities belong (such as the type of digital characters, unit characters, etc.).

The processing unit 30 is further configured to: after constructing the array of input identities, generate a set of soft keypad keys corresponding to the array of input identities which comprises at least one input identity, the set of soft keypad keys comprising at least one soft keypad key; create a mapping relationship between the identities in the array of input identities and the soft keypad keys in the set of soft keypad keys, generate a specific soft keypad display box according to the mapping relationship, display the specific soft keypad display box by the touch sensing unit, the specific soft keypad display box comprising the at least one soft keypad key, each key corresponding to one input identity.

The processing unit 30 is further configured to: after displaying the specific soft keypad display box, obtain a second input operation for a specific key in the specific soft keypad display box via the touch sensing unit, search the created mapping relationship between the identities and the soft keypad keys, obtain an identity matching with the specific key, and display data corresponding to the obtained identity in the specific soft keypad display box.

The processing unit 30 is further configured to: after displaying the specific soft keypad display box, make a statistic on the number of operations for the keys in the specific soft keypad display box, and delete, from the mapping relationship, identities corresponding to the keys for which the number of operations during a second preset duration is below a second threshold; and/or make a statistic on identities having no corresponding key in the specific soft keypad display box and a corresponding number of input times, add, into the array of input identities, identities having no corresponding key in the specific soft keypad display box for which the number of input times during a third preset duration is higher than a third threshold, create a mapping relationship between the newly added identities and the corresponding new soft keypad keys, and display the new soft keypad keys according to the mapping relationship in the specific soft keypad display box.

It should be noted that the above display unit 10 can be implemented by a display screen of the electronic device, the touch sensing unit 20 can be implemented by a touch sensing screen of the electronic device, the processing unit 30 can be implemented by a Central Processing Unit (CPU), a Micro Processor (MPU), a Digital Signal Processor (DSP) or a Field Programmable Gate Array (FPGA) in the electronic device, and the keystroke unit 40 can be implemented by a keypad of the electronic device which may be a physical keypad or a virtual keypad.

In summary, the embodiments of the disclosure can make a determination according to the detected first input operation, and determine whether to display the corresponding array of input identities. According to the embodiments of the disclosure, the frequent toggle between two operations of touching the touch screen and tapping the physical keypad when the user is performing a longtime input operation can be avoided, which reduces the operation strain of the user and improves the input efficiency. As compared with the soft keypad provided by the existing operation system, the array of input identities facilitates the user to search for characters desired to be input because the accurate positioning of the identities to be inputted and the relatively small number of the identities. Further, as compared with the soft keypad provided by the operation system, the soft keypad for the array of input identities can be rapidly popped on and thus the input efficiency is improved.

In the embodiments of the disclosure, it can be appreciated from the embodiments of the present application that the disclosed device and method can be implemented in alternative ways. The device embodiments as described above are illustrative only. For example, while the units have been divided in accordance with their logical functions, other divisions are possible in practice. For example, more than one unit or element can be combined or can be integrated into another system, or some features can be ignored or omitted. In addition, the coupling, direct coupling or communicative connection between various components as shown or discussed can be an indirect coupling or communicative connection via some interface, device or unit and can be electrical, mechanical or in another form.

The units described above as separated may or may not be physically separated. The components shown as units may or may not be physical units. They can be co-located or can be distributed over a number of network elements. Depending on actual requirements, some or all of the units can be selected to achieve the object of the present disclosure.

Further, all the functional units in various embodiments of the present disclosure can be integrated within one processing unit, or each of these units can be a separate unit, or two or more units can be integrated into one unit. Such integrated unit can be implemented in hardware, possibly in combination with software functional units.

It may be understood by the skilled in the art that all or parts of steps for implementing the above method embodiments may be implemented by hardware associated with program instructions. The above program may be stored in a computer readable storage medium, which when executed, may perform steps of the above method embodiments. The above storage medium may comprise various media which may store program codes, such as a movable storage device, a read-only memory, a random access memory, a magnetic disc or an optical disc.

Or, if the units of the embodiments of the present disclosure integrated as described above are implemented in a form of software functional modules and are sold or used as a separate product, they may also be stored in a computer readable storage medium. Based on such understanding, the technical solution of the embodiment in the present disclosure may substantially, or the part of the technical solution contributing to the prior art may be embodied in a form of a software product. The computer software product is stored in a storage medium comprising several instructions which may be used for causing one computer device (which may be a personal computer, a server, or a network device etc.) to perform all or parts of the methods of various embodiments in the present disclosure. The storage medium as described above may comprise various media which may store program codes, such as a movable storage device, a read-only memory, a random access memory, a magnetic disc or an optical disc.

As illustrated above, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. An information processing method used in an electronic device comprising:
   detecting, by a touch sensing screen, a first input operation;
   determining whether a target of the first operation satisfies a first condition; wherein the target of the first input operation comprises an input area for the first input operation or an application being performed by the first input operation;
   executing a first instruction set in response to determining that the first condition is satisfied;
   wherein the first instruction set comprises
      at least a first display instruction for displaying an array of input identities on a display screen of the electronic device, wherein the display screen is overlapped with the touch sensing screen,
         wherein the array of input identities comprises more than one input identity and each of the more than one input identity in the array of input identities is a key on a soft keypad,
         wherein each of the more than one input identity is an identity which is capable of being triggered by a second input operation detected by the touch sensing screen so as to input data corresponding to the input identity,
      and wherein executing the first display instruction further comprises:
         obtaining a set of identities being acceptable by the input area for the first input operation;
         obtaining number times every identity in the set of identities is triggered within a first preset duration; and
         constructing the array of input identities, wherein the number of times each identity in the array of input identities is triggered during the first preset duration is higher than a first threshold value greater than zero; and
   displaying the array of input identities.

2. The information processing method d of claim 1, further comprising:
   detecting the second input operation by the touch sensing screen, after the array of input identities is displayed; and
   inputting data corresponding to the input identity triggered by the second input operation;
   detecting a third input operation by a physical keypad or the array of input identities, and
   inputting data corresponding to the input identity of the physical keypad or the first array of input identify triggered by the third input operation.

3. The information processing method of claim 1, wherein the first condition is that the first input operation is an operation for positioning an area where a data input can be received; and
   the first processing instruction is used to determine a data input location of the positioning operation, and to generate notification information.

4. The information processing method of claim 2, wherein the first condition further comprises:
   an application for which the first input operation is performed satisfies a first sub-condition, or
   an area for the first input operation where a data input can be received satisfies a second sub-condition, or both.

5. The information processing method of claim 2, wherein executing the first display instruction further comprises:
   calculating a display location for the array of input identities according to the data input location of the positioning operation and based on a first parameter; and
   displaying the array of input identities at the display location by the display unit.

6. The information processing method of claim 1, wherein the array of input identities are one or more specific types of input identities.

7. An electronic device, comprising:
   a display screen, configured to display content of the electronic device; a touch sensing screen overlapped with the display screen, configured to detect an input operation;
   a processor, configured to determine whether a target of a first input operation detected by the touch sensing screen satisfies a first condition,
   execute a first instruction set in response to determining that the first condition is satisfied,
      wherein the target of the first input operation comprises an input area for the first input operation or an application being performed by the first input operation, wherein the first instruction set comprises at least a first display instruction for displaying an array of input identities on the display screen, and wherein the array of input identities comprises more than one input identity and each of the more than one input identity in the array of input identities is a key on a soft keypad, the input identity being an identity which is capable of being triggered by a second input operation detected by the touch sensing unit in order to input data corresponding to the input identity;

wherein the processor is further configured to:
 obtain a set of identities being acceptable by the input area for the first input operation;
 obtain a number of times every identity in the set of identities inputted is triggered within a first preset duration; and
 construct the array of input identities, wherein the number of times each identity the array of input identities is triggered during the first preset duration is higher than a first threshold value greater than zero; and displaying the array of input identities by the display screen.

8. The electronic device of claim 7, further comprising a physical keypad; and the processor is further configured to,
 detect a second input operation by the touch sensing screen after the array of input identities is displayed, and input data corresponding to the input identity triggered by the second input operation, and
 detect a third input operation by the physical keypad or the array of input identities, and input data corresponding to the input identity of the physical keypad or the first array of input identity triggered by the third input operation.

9. The electronic device of claim 7, wherein the processor is further configured to: calculate a display location for the array of input identities according to the data input location of the first input operation and based on a first parameter; and display the array of input identities at the display location by the display unit.

10. The electronic device of claim 7, wherein
 the array of input identities are one or more specific types of input identities.

* * * * *